United States Patent Office 2,935,525
Patented May 3, 1960

2,935,525

ESTERIFICATION OF ORGANIC ACIDS

Allen G. Debus, Waukegan, Ill., assignor to Abbott Laboratories, North Chicago, Ill., a corporation of Illinois No Drawing. Application August 13, 1956
Serial No. 603,824

6 Claims. (Cl. 260—472)

This invention relates to a new method of esterification and more particularly to the preparation of amino esters by the direct esterification of acids with tertiary amino alcohols.

Many economically valuable products are formed by the reaction between certain organic acids and tertiary amino alcohols as, for example, diethylaminoethyl p-aminobenzoate, known commercially as procaine base. The most generally used methods for synthesizing procaine comprises alcoholysis of a methyl or ethyl group in methyl or ethyl p-aminobenzoate by means of diethylaminoethanol, reacting sodium p-aminobenzoate with diethylaminoethyl chloride, condensing β-chloroethyl p-aminobenzoate with diethylamine, and forming diethyl aminoethyl p-nitrobenzoate followed by reducing the latter ester to the corresponding p-aminobenzoate.

Direct esterification of p-nitrobenzoic acid with diethylaminoethanol has been attempted in the presence of an acid catalyst, such as hydrochloric acid or sulfuric acid, however, such a combination actually reduces the yields and the speed of the reaction, for the amino group in the amino alcohol introduces a basic element into the reaction which forms, in part, a salt with the acid catalyst. It can be readily seen that this problem will be present in any direct esterification process which utilizes an amino alcohol as one of the reactants and an acid catalyst.

The object of this invention is to provide a more economical method for direct esterification of acids and tertiary amino alcohols.

Another object is to provide a method for direct esterification of tertiary amino alcohols with acids having a more rapid reaction rate.

A still further object is to provide a method of preparing procaine which gives yields closely approximating theoretical values.

In accordance with these and other objectives, there is now provided a method for the direct esterification of acids and tertiary amino alcohols in an organic solvent providing high yields of the desired ester product without the use of an added catalyst. Equimolar portions of an acid, such as p-nitrobenzoic acid, and a tertiary amino alcohol, such as diethylaminoethanol, are added to an inert organic solvent and reacted under reflux conditions. The water formed from this reaction is continuously taken off and separated so as to allow the reaction to continue. Failure to remove the water from the reaction would result in substantially reduced yields. Ordinarily, it is convenient to remove the water as an azeotrope by forming an azeotrope with an inert, substantially water-immiscible solvent, such as xylene, amylacetate, etc. The boiling point of the solvent water azeotrope should not be substantially higher than that of the lower boiling of the principal reactants, which is usually the amino alcohol. While it is possible to calculate the amount of water formed in the reaction and the amount of solvent which will be required to remove it, it is usually more convenient to work with smaller volumes of liquids and to employ conventional techniques of collecting the distilled azeotrope, separating the water-immiscible solvent and continuously returning said solvent to the reactor.

The concentration of the reactants in the organic solvent is a factor affecting the yield of the ester product. In general, a greater dilution results in greater yields.

Among the tertiary amino alcohols which are employed in the present invention are such representative di-lower alkylamino alkanols as dimethylaminoethanol, dibutylaminopropanol, diethylaminoethanol, and dimethylaminopropanol. The heterocyclic aminoalkanols may also be used, such as the piperidinoalkanols, the pyrrolidinoalkanols, the piperizinoalkanols and the morpholinoalkanols.

The following examples illustrate the present invention and teach the advantages of the invention over the prior art practice of direct esterification in the presence of an acid catalyst. The examples are not intended to limit the application to the precise reactants, solvents and conditions set forth by way of illustration only.

*Example I*

The p-nitrobenzoic acid, 84 gms., is slurried together with one liter of xylene, and 61 gms. of diethylaminoethanol is added. The mixture is heated in a refluxor fitted with a water separator, and the water formed in the reaction is distilled off as it is formed. After 24 hours, 9.0 cc. of water is removed; this coincides exactly with the expected theoretical value.

The solution is cooled and treated with a filter aid, such as Hyflo, and an activated carbon, such as Darco G-60, filtered, cooled to 10° C. and extracted with 290 cc. of 7% sodium hydroxide. The solution is then filtered and washed with 200 cc. portions of water three times, dried and separated over 100 gms. of soda ash. The solution is then filtered and gassed with hydrochloric acid, filtered and slurried in 1500 cc. of benzene, filtered and dried in air. The product, diethylaminoethyl p-nitrobenzoate, is obtained in a yield of 78.8%. The recrystallized product has a melting point of 177–179° C.

*Example II*

The product of Example I in the form of the hydrochloride (34.0 gms.) is then dissolved in enough distilled water to make 100 gms. of solution which is then treated with activated carbon, such as Darco G-60, and filtered. To this solution, one gm. of 5% palladium on carbon is added as a catalyst, and the solution is then hydrogenated in a Parr hydrogenator. The reaction is completed in 1½ hours. The solution is filtered and made basic with sodium hydroxide solution. The product of Example I is thus converted to diethylaminoethyl p-aminobenzoate. From the original 34.0 gms. of nitroprocaine, 24.0 gms. of procaine base was obtained, or a 90.9% yield. The procaine base was assayed as 96.06% pure.

*Example III*

The mixture of p-nitrobenzoic acid and diethylaminoethanol in xylene is prepared as in Example I. The mixture is then gassed with HCl acid until the solution becomes strongly acidic. The solution was heated for 18¾ hours in a refluxor fitted with a water separator. At the end of this period, only 4.8 cc. of water was taken off, or 53.3% of the theoretical level of 9.0 cc. Comparing this yield to the direct esterification without an acid catalyst, as performed in Example I, indicated that the water removed in Example I at 18¾ hours was 8.9 cc. or a value very close to the theoretical level of 9.0 cc.

The relatively low yield of product obtained following the use of an acid catalyst demonstrates the superiority of the present process.

Example IV

The p-nitrobenzoic acid (34 pounds) and 25 pounds of diethylaminoethanol are added to 50 gallons of xylene and refluxed for 24 hours with a water separator. The water formed in the reaction is removed by distillation as it is formed. The solution is cooled to 22° C. and caustic solution is added (8 pounds of 50% sodium hydroxide in 6 gallons of distilled water). The solution is filtered through a filter and pumped back into the still, separated and washed with two 5-gallon portions of water. To form the hydrochloride salt of diethylaminoethyl p-nitrobenzoate, the solution is acidified with dilute hydrochloric acid solution to a pH about 3.5. The water layer containing the product is separated. Activated carbon, such as Darco G-60, is added to decolorize. A yield of 84.6% of the hydrochloride of diethylaminoethyl p-nitrobenzoate was obtained.

The water solution of the latter hydrochloride product is placed in a 100-gallon hydrogenator and 1% based on the weight of the said product in solution of 5% palladium on carbon is added and the product in solution is reduced in the usual manner. The reaction is completed in 12 hours and run through a filter press. The press is washed with distilled water. An overall yield of 79.2% of the hydrochloride of procaine is obtained.

Example V

Eighty-four grams of p-nitrobenzoic acid is slurried with one liter of xylene, and 102 grams of dibutylaminopropanol is added. The reaction is performed according to the method of Example I. The product is dibutylaminopropyl p-nitrobenzoate hydrochloride.

A solution of dibutylaminopropyl p-nitrobenzoate hydrochloride is then hydrogenated according to the procedure of Example II to form dibutylaminopropyl p-aminobenzoate, known commercially as Butyn hydrochloride. The product is obtained in a yield of 62.1%. The recrystallized product has a melting point of 100–102° C.

Analysis for $C_{18}H_{31}N_2Cl_1O_2$: Theory: C, 59.75; H, 9.15; N, 7.77; Cl, 9.85; O, 13.32. Found: C, 60.31; H, 9.50; N, 7.76; Cl, 9.96; O, 13.08.

Example VI

Eighty-four grams of p-nitrobenzoic acid is slurried with one liter of xylene and 45 grams of dimethylaminoethanol is added. The reaction is performed according to the method of Example I. The product is dimethylaminoethyl p-nitrobenzoate hydrochloride obtained in a yield of 42%.

Forty-one grams of this compound is dissolved in water with one gram of 5% palladium on carbon as a catalyst. The solution is hydrogenated in a Parr hydrogenator and the product is thus reduced to β-dimethylaminoethyl p-aminobenzoate hydrochloride. This solution is then treated with 36 grams of butyl aldehyde and then hydrogenated further to produce β-dimethylaminoethyl p-butylaminobenzoate hydrochloride, known commercially as Tetracaine hydrochloride.

Example VII

Sixty-one grams of benzoic acid was slurried with one liter of xylene, and sixty-one grams of diethylaminoethanol is added. The reaction is performed according to Example I. The product is diethylaminoethylbenzoate hydrochloride obtained in a yield of 67%. The recrystallized product has a melting point of 122–124° C.

Analysis for $C_{13}H_{19}N$: Theory: C, 60.58; H, 7.76; N, 5.43. Found: C, 60.41; H, 7.70; N, 5.56.

Example VIII

Eighty-four grams of p-nitrobenzoic acid is slurried with one liter of xylene and 66 grams of amylaminoethanol is added. The reaction is performed according to the method of Example I. The product is 2-amylaminoethyl p-nitrobenzoate hydrochloride. A solution of this product is then hydrogenated according to the procedure of Example II to form 2-amylaminoethyl p-aminobenzoate hydrochloride, known commercially as Naepaine hydrochloride or Novacol.

Example IX

Eighty-four grams of p-nitrobenzoic acid is slurried in one liter of xylene and 59 grams of 2-isobutylaminoethanol is added. The reaction is performed according to the method of Example I. The product is 2-isobutylaminoethyl p-nitrobenzoate hydrochloride which upon reduction according to the method of Example II forms 2-isobutylaminoethyl p-aminobenzoate hydrochloride, known commercially as Butethamine hydrochloride or Monocaine hydrochloride.

Example X

Sixty-one grams of benzoic acid is slurried with one liter of xylene and 79 grams of 3-(2-methyl-1-piperidyl) propanol is added. The reaction is performed according to the method of Example I. The product is 3-(2-methyl-1-piperidyl)propyl benzoate or Piperocaine hydrochloride.

Example XI

Eighty-four grams of p-nitrobenzoic acid is slurried in one liter of diethylbenzene and 61 grams of diethylaminoethanol is added. The mixture is heated in a refluxor fitted with a water separator, and the water formed in the reaction is distilled off as it is formed. After 3½ hours, 9.5 cc. of water is removed. Discoloration of the solution gives clear evidence of some decomposition.

The solution is cooled and treated with a filter aid, such as Hyflo, and on activated carbon, such as Darco G-60, filtered, cooled to 10° C. and extracted with water to remove the formed diethylaminoethanol salt of p-nitrobenzoic acid. The solution is filtered, washed with water, dried and separated over 100 grams of soda ash. After three hours, the solution is filtered and gassed with hydrochloric acid, filtered and dried in air. The product, diethylaminoethyl p-nitrobenzoate hydrochloride, is obtained in a yield of 67.5% which is 78.6% pure.

While xylene is the preferred solvent in the present process, other organic solvents can be used if desired. For example, an inert organic solvent, having a boiling point below about 180° C. and not lower than about 120° C., is suitably used in the instant process. It is accordingly provided that the temperature of the esterification reaction is between 120° C. and 180° C. In addition to having a boiling point within the above specified range, the solvent must possess the further attributes of being inert and non-miscible with water. Among the suitable solvents are aromatic hydrocarbons such as xylene and diethylbenzene, ester solvents like methylamylacetate, ether solvents like n-butyl ether, aliphatic hydrocarbon solvents like dicyclopentadiene, and the like.

The principles of this invention as taught by the accompanying examples show that they can be applied to the direct esterification of organic acids with tertiary amino alcohols without the presence of an added catalyst, thus, providing good yields without the complications of salt formations between the amino group in the alcohol and in acid catalyst.

Others may readily adapt the invention for use under various conditions of service by employing one or more of the novel features disclosed or equivalents thereof. As at present advised with respect to the apparent scope of my invention, I desire to claim the following subject matter.

I claim:

1. In the method of making an amino ester which comprises forming a reaction mixture with a di-lower alkylamino alcohol selected from the group consisting of diethylaminoethanol, dibutylaminopropanol, dimethylaminoethanol, amylaminoethanol and 2-isobutylaminoethanol and an organic acid selected from the group consisting of benzoic acid and nitrobenzoic acid the improvement which comprises: forming said mixture in an inert organic solvent substantially immiscible with water and having a boiling point between 120–180° C. at a concentration of about one-half mole of each reactant in about one liter of said solvent, heating said reaction mixture without the presence of a catalyst between 120–180° C. while removing the water formed in the reaction by azeotropic distillation.

2. In the method of making an amino ester which comprises forming a reaction mixture of p-nitrobenzoic acid and diethylaminoethanol the improvement which comprises: forming said mixture in an inert organic solvent substantially immiscible with water and having a boiling point between 120–180° C. at a concentration of about one-half mole of each reactant in about one liter of said inert organic solvent, heating said reaction mixture without the presence of a catalyst to a reaction temperature of 135–140° C. while continuously removing the water formed in the reaction by azeotropic distillation and, thereafter, recovering the said ester.

3. In a method of making an amino ester which comprises forming a reaction mixture of p-nitrobenzoic acid and diethylaminoethanol the improvement which comprises: forming said mixture in xylene at a concentration of about one-half mole of each reactant in about one liter of said xylene, heating said reaction mixture without the presence of a catalyst to a reaction temperature of 135–140° C. while continuously removing the water formed in the reaction by azeotropic distillation and, thereafter, recovering the said ester.

4. The improved process of claim 3 whereby dibutylaminopropane is substituted for diethylaminoethanol.

5. The improved process of claim 3 whereby amylaminoethanol is substituted for diethylaminoethanol.

6. The improved process of claim 3 whereby 2-isobutylaminoethanol is substituted for diethylaminoethanol.

References Cited in the file of this patent

UNITED STATES PATENTS

| | | |
|---|---|---|
| 837,899 | Emilewicz | Dec. 4, 1906 |
| 2,383,074 | Parker | Aug. 21, 1945 |
| 2,410,197 | Borglin | Oct. 29, 1946 |
| 2,541,961 | Glarum et al. | Feb. 13, 1951 |

FOREIGN PATENTS

| | | |
|---|---|---|
| 611,098 | Great Britain | Oct. 28, 1948 |

OTHER REFERENCES

Groggins: Unit Processes in Organic Synthesis, 4th Edition pages 609–610 (1952).